(12) United States Patent
Queveau et al.

(10) Patent No.: US 7,360,828 B2
(45) Date of Patent: Apr. 22, 2008

(54) SLIDING ROOF SYSTEM WITH STACKABLE PANELS AND VEHICLE EQUIPPED THEREWITH

(75) Inventors: Gerard Queveau, Le Pin (FR); Paul Queveau, Montravers (FR); Jean-Marc Guillez, Cirieres (FR)

(73) Assignee: Société Européenne de Brevet Automobiles, Paris (FR)

( * ) Notice: Subject to any disclaimer, the term of this patent is extended or adjusted under 35 U.S.C. 154(b) by 13 days.

(21) Appl. No.: 10/564,513

(22) PCT Filed: Jul. 16, 2004

(86) PCT No.: PCT/FR2004/001884

§ 371 (c)(1),
(2), (4) Date: May 31, 2006

(87) PCT Pub. No.: WO2005/007434

PCT Pub. Date: Jan. 27, 2005

(65) Prior Publication Data

US 2006/0214464 A1    Sep. 28, 2006

(30) Foreign Application Priority Data

Jul. 16, 2003  (FR) ................... 03 08694
Jul. 16, 2003  (FR) ................... 03 08695
Aug. 8, 2003   (FR) ................... 03 09792

(51) Int. Cl.
*B60J 7/47*    (2006.01)
*B60J 7/14*    (2006.01)

(52) U.S. Cl. .................. 296/220.01; 296/108

(58) Field of Classification Search ........... 296/220.01, 296/222, 216.02, 216.03, 108
See application file for complete search history.

(56) References Cited

U.S. PATENT DOCUMENTS 4,877,285 A * 10/1989 Huyer ................... 296/216.03

(Continued)

FOREIGN PATENT DOCUMENTS

FR    2 730 958    8/1996

(Continued)

OTHER PUBLICATIONS

Translation and Figure for FR2730958 Translation From http://world.altavista.com/tr.*

*Primary Examiner*—Dennis H Pedder
*Assistant Examiner*—Melissa Black
(74) *Attorney, Agent, or Firm*—Winston & Strawn LLP; Richard P. Gilly (57) ABSTRACT

The invention concerns a sliding roof system for a vehicle, comprising at least one front roof panel (40) and one rear roof panel (48), mobile relative to each other between a flush position and an offset position in height. One of the roof panels comprises assemblies of front and rear levers articulated to tilt between a low position and a high position wherein the panel involved is offset in height relative to its flush level. One of the panels comprises driving means for driving the lever assemblies either from the front rearwards, to raise the panel, or inversely, to shift it from its offset position towards its flush position. The lever assemblies engage guides (41, 44) adapted, upon controlled displacement from the front rearwards of the lever assemblies, to guide their tilting movement upwards and, upon reverse displacement, to guide their tilting movement downwards.

11 Claims, 7 Drawing Sheets

U.S. PATENT DOCUMENTS

| | | |
|---|---|---|
| 6,409,260 B1 | 6/2002 | Bohm et al. |
| 2002/0125743 A1 | 9/2002 | Bohm et al. |
| 2002/0163227 A1 | 11/2002 | Pfalzgraf et al. |

FOREIGN PATENT DOCUMENTS

| | | |
|---|---|---|
| FR | 2 798 327 | 3/2001 |

* cited by examiner

FIG.2

SLIDING ROOF SYSTEM WITH STACKABLE PANELS AND VEHICLE EQUIPPED THEREWITH

FIELD OF THE INVENTION

The invention relates to a retractable roof for vehicles, and more precisely such a roof comprising several rigid roof panels (or elements), of which at least one can be displaced between a position in which the roof panels cover the passenger compartment, from above, and a position in which they uncover an opening in the roof.

BACKGROUND

Some roofs, including if need be that of the invention, are retractable behind the vehicle, thus allowing to transform a saloon or coupe-type vehicle into a convertible-type vehicle.

One of the problems encountered in the designing of this type of roof lies in the stowing of the roof elements in the rear boot of the vehicle.

Another problem lies in the designing and performing of the kinematics of movement of the roof elements when they are above the roof.

It is for this reason that a retractable roof system for a motor vehicle will be considered, as well as a thus equipped vehicle.

Different retractable roof systems are already known comprising at least a front roof panel and rear roof panel, these panels being moveable along a longitudinal direction (corresponding to the longitudinal driving direction of the vehicle) between a flush position in which the panels are placed substantially at the same level as each other, the front roof panel thus being located in front of the rear roof panel, along said longitudinal direction, and an off-set position in an upward direction in which the roof panels are placed one on top of the other.

From such a known system, an aim is to propose a reliable retractable roof system, with relatively simple mechanics, production costs compatible with mass production in association with a motor vehicle manufacturer, and which avoids the already encountered co-ordination of panel movement problems ensuring efficient and reliable kinematics.

SUMMARY OF THE INVENTION

For this reason, a major feature provides that:

one of the front and rear panels comprises a group of front levers and a group of rear levers pivotally mounted in relation to this roof panel, so as to tip over between:

a low position in which the panel in question is substantially flush with a surround part of the structure of the vehicle;

and a high position in which said panel in question is off-set in an upward direction in relation to the level of its flush position;

at least one of said roof panels comprising the lever groups and the other panel comprises driving means for driving the lever groups and one of the panels:

either from the front towards the rear, along a distance ensuring the roof panel moves from its flush position to its off-set position in an upward direction;

or from the rear towards the front, along said distance, but in the opposite direction, to ensure the roof panel in question moves from its off-set position to its flush position; and the lever groups engage, under the control of the driving means, guides extending essentially substantially parallel to said longitudinal direction, these guides being adapted for:

during the controlled displacement of the lever groups from the front towards the rear, guiding their tipping over movement from the flush position of the corresponding panel to its off-set position; and during the controlled displacement of the same lever groups from the rear towards the front, guiding their tipping over movement from the off-set position of the corresponding panel towards its flush position.

To further contribute to reaching the aforementioned aims, using simple, efficient and reliable mechanical conception, another feature recommends that the lever groups individually comprise a curved lever comprising a first arm rotatingly articulated on the corresponding roof panel and firmly attached via an elbow to a second arm, which engages one of said guides, in order to guidingly drive it.

Still with the same aim, and drawing on the already known use of "runner" type sliding means, another feature provides that the guides of the levers fitted to the roof panel(s) in question advantageously comprise runners in which these lever groups slide, the runners locally having deflected slips extending obliquely in relation to the horizontal and in relation to said longitudinal direction, along a sufficient length to receive, individually, a part of said lever groups, so that once engaged in these deflected slips, the lever groups in question move, by pivoting, from one of their high or low positions towards the other position.

If, as is supposed, a benefit is found in using the two preceding features, it is moreover recommended, to simplify the slide driving as much towards the front as towards the rear of the roof panel(s) in question:

that the second arm of some of the panels is slidingly mounted in relation to the other along said longitudinal direction, along second grooves of said runners;

that at least some of the levers fitted to the corresponding panel at least comprise a slider mounted sliding in the first corresponding groove;

that said driving means have a front end and a rear end, and that these driving means comprise a driving hook bearing a driving recess adapted for receiving said slider and driving it along the corresponding guide, the recess extending frontwards via a driving wall adapted for driving the corresponding slider backwards, along said first groove, this recess extending backwards via a short driving pin making an inlet for the slider, via the rear of said driving hook, so that the short driving pin drives the slider frontwards as long as it engages the first groove substantially along said longitudinal direction, but extricating from the slider when the latter engages in the deflected slip of said first groove that it encounters, this deflected slip thus being located in the extension of the groove and making an obtuse angle with it so that the slider can engage in the direction of its drive.

Such a feature is specially applicable in cases where the front roof panel is slidingly mounted in relation to the rear panel in order to move under it.

In this case, it is subsidiarily recommended that:

the sliders are placed on the second arm of at least some of the levers;

that said driving means are extended along the longitudinal direction of displacement of the roof panels in relation to each other; and that the deflected, or deflected, slips of each first groove are oriented upwards, the lever groups being linked to the rear panel under which said first groove extends.

In conjunction with all or part of the aforementioned features relating to these roof panel mechanics, we thus obtain a reliable and efficient mechanism for such a movement making the front roof element to move under the rear roof element.

Particularly in this case, another feature even recommends that the driving means comprise, towards their rear end, a contact surface adapted for engaging at least a lever of the front lever group, when said lever is in the low position and of driving it along with itself in the backwards direction of displacement of said driving means.

Still in the same situation, we yet again recommend that the driving means of the front roof panel comprise, towards their rear end, a second driving pin adapted for fully engaging, in the corresponding deflected slips, the second arm of the front lever group fitted to the rear roof panel, once these levers are free from the corresponding short driving pin, consecutively with a forward sliding of the front roof panel, so that the rear roof panel then moves into its flush position.

This second pin allows to ensure, with a simple, reliable and efficient solution, a fully engaging of the levers into the corresponding deflected slips, thus in an efficient manner displacing the rear roof panel into its flush, low position.

Moreover, to overcome the problem evoked at the start of the description on stowage of the roof elements in the rear boot of the vehicle, we furthermore propose that the retractable roof comprises;

- a rear central roof element, an intermediary central roof element and a front central roof element;
- a rear left side roof element, a front left side roof element, a rear right side roof element and a front right side roof element;
- means for sliding the rear central roof element into a tailgate;
- means for placing the intermediary central roof element and the front central roof element in the closed position and for vertically folding back all the elements at the front of the rear boot;
- means for placing the rear left side roof element and the front left side roof element in the closed position and for horizontally folding back all the elements in the rear boot at the rear of all the elements constituted by the intermediary central roof element and the front central roof element; and
- means for placing the rear right side roof element and the front right side roof element in the closed position and for horizontally folding back all the elements in the boot above or below all the elements constituted by the rear left side roof element and the front left side roof element.

As it will have been understood from the above, the means for placing the intermediary central roof element and the front central roof element in the closed position advantageously comprise means for relative sliding of the intermediary central roof element and the front central roof element.

More precisely, said means for sliding can comprise at least a longitudinal side runner on which the intermediary central roof element is mounted, and laid out to co-operate with a slider on which the front central element is mounted.

It will then be possible to slide the front central roof element so as to bring it in the vicinity of the intermediary central roof element, and thus free the front section of the roof.

We note that, the expression "longitudinal" generally means parallel to the front/rear direction of the vehicle. Likewise, the expression "transversal" generally means perpendicular to the symmetrical plane of the vehicle.

Still more precisely, said slider can comprise rollers adapted for moving along a first groove of said runner.

Furthermore, the intermediary central roof element can be mounted on the rollers adapted for moving along a second groove of said runner.

Also in a specific embodiment, the means for vertically folding back all the elements constituted by the intermediary central roof element and the front central roof element at the front of the rear boot comprise at least two levers articulated about one of their ends on the vehicle chassis and creating a distortable quadrilateral.

In the case of a runner assembly, said levers can be articulated at their other end about said runner.

In a specific embodiment, the means for placing the rear left side (respectively right side) roof element and the front left (respectively right) roof element in the closed position comprise an articulation about a transversal axis between the front edge of the rear left side (respectively right side) roof element and the rear edge of the front left side (respectively right side) roof element.

The side section of the roof therefore folds back about an intermediary axis.

Also in a specific embodiment, the means for horizontally folding back, into the rear boot, all the elements constituted by the rear left side (respectively right side) roof element and the front left side (respectively right side) roof element comprise a folding device articulated on the vehicle chassis about a longitudinal axis between a closed position and a stowed position, and the rear left side (respectively right side) roof element is articulated in the vicinity of its rear edge on said folding device about a generally transversal axis when said folding device is in its closed position and generally vertical when said folding device is in its stowed position.

More precisely, the means for placing the rear left side (respectively right side) roof element and the front left side (respectively right side) roof element in the closed position can comprise at least a lever with one of its end articulated on the folding device at a given distance from the axis of articulation of the rear left side (respectively right side) roof element and its other end articulated on the front left side (respectively right side) roof element at a given distance from the axis of articulation of the rear left side (respectively right side) roof element.

BRIEF DESCRIPTION OF THE DRAWINGS

A more detailed description of the subject follows in reference to the annexed diagrammatic drawings in which:

FIG. 7 demonstrates another roof mechanism allowing relative sliding of a front roof element (panel) in relation to a rear roof element (panel), the two panels being in the closed position, substantially in line one in front of the other in FIG. 7, whereas the front panel moves under the rear panel in FIG. 8;

DETAILED DESCRIPTION

Figure 1:
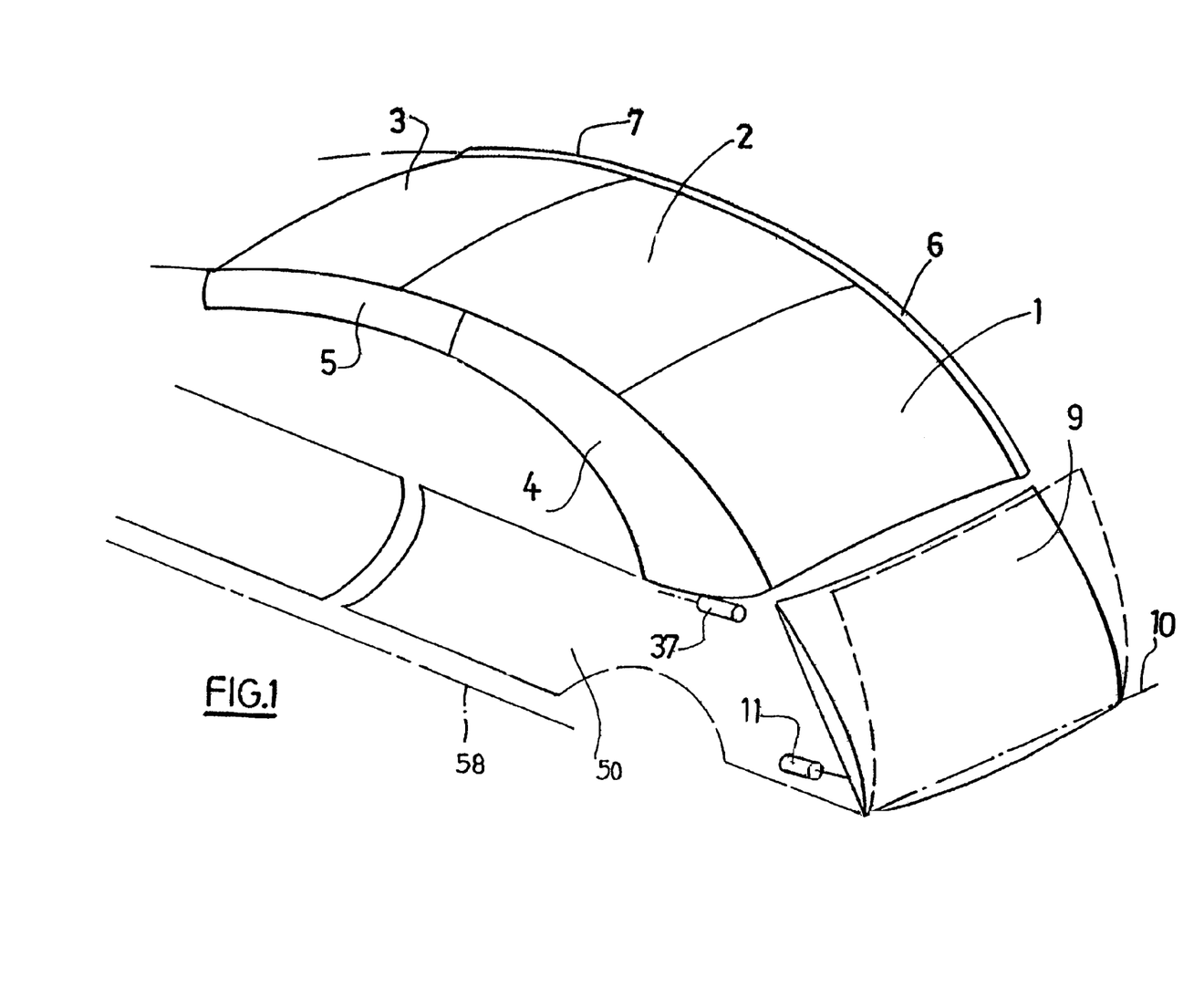
FIG. 1 is a perspective view of a retractable roof operable in this instance.

The roof shown in FIG. 1 comprises a rear central roof element 1, generally constituted of the rear windscreen, an intermediary central roof element 2 and a front central roof element 3 coming into contact with the upper edge of the front windscreen. The roof according to the invention also comprises a rear left side roof element 4, a front left side roof element 5, a rear right side roof element 6 and a front right side roof element 7.

These roof elements consequently link from front to back the upper edge of the front windscreen to the upper edge of the tailgate 9 of the rear boot and on the sides the upper edges of the side windows of the vehicle (not represented).

Known means, and thus consequently not described below, allow to slide the rear central roof element, and more precisely its window, in the tailgate 9. Moreover, this tailgate 9 is articulated along its lower edge of the chassis of the vehicle along a transversal axis of rotation 10, and operable via an actuator 11 allowing it to open and the insertion of the rear central roof element 1.

The layout described below is generally of the same type on either side of the vehicle.

Figures 3, 4:
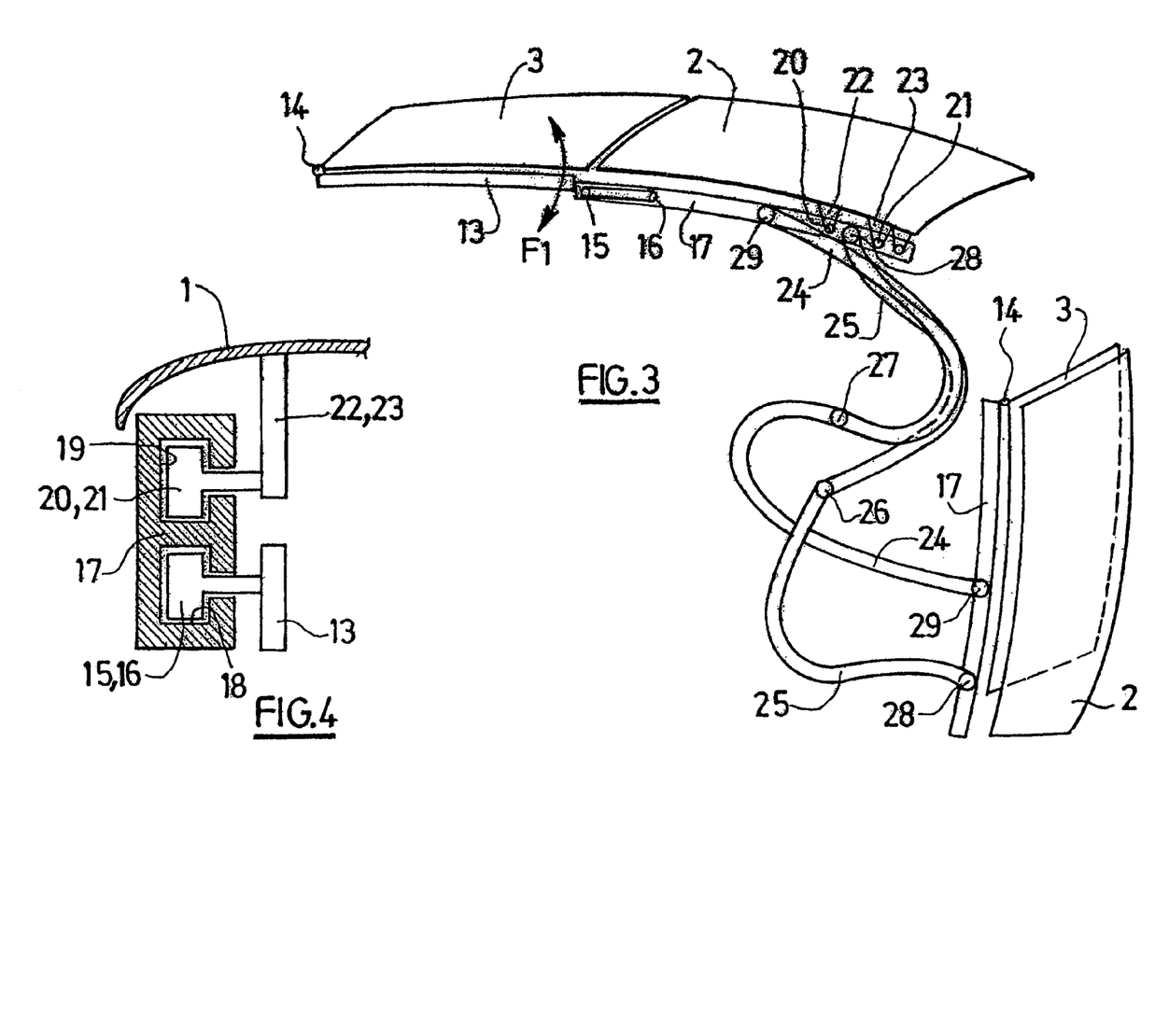
FIG. 3 is a perspective view of the means for stowing the central roof elements in their closed position and in their stowed position.
FIG. 4 is a deflected section of the runners in FIG. 3.

As demonstrated in FIG. 3, the front central roof element 3 is laterally mounted on sliders 13. The front central element 3 is mounted on the sliders 13 via a transversal axis of rotation located on the front edge of the element 3 and at the far end of the sliders 13. This axis of rotation allows an upward and downward movement according to the arrow F1 of the rear edge of the element 3.

Each slider 13 is mounted via rollers 15 and 16 on a runner 17. The runner 17 comprises two grooves 18 and 19, the groove 18 receiving the rollers 15 and 16.

The groove 19 receives two rollers 20 an 21 integral with two fittings 22 and 23 supporting the intermediary central roof element 2.

Drive means of any known type allow to slide the sliders 13 in the runners, as well as the sliding of the rollers of the fittings 22 and 23 in the same runners.

Two levers 24 and 25 are articulated about a transversal axis, respectively 26 and 27, to the chassis of the vehicle at one of their ends. At their other end, these levers are articulated, also about a transversal axis to the runner 17 about axes 28 and 29. These levers 24 and 25 are represented at the top of FIG. 3 in the position they take when the roof covers the passenger compartment, and at the bottom of the drawing when the roof is stowed in the rear boot.

Figure 2:
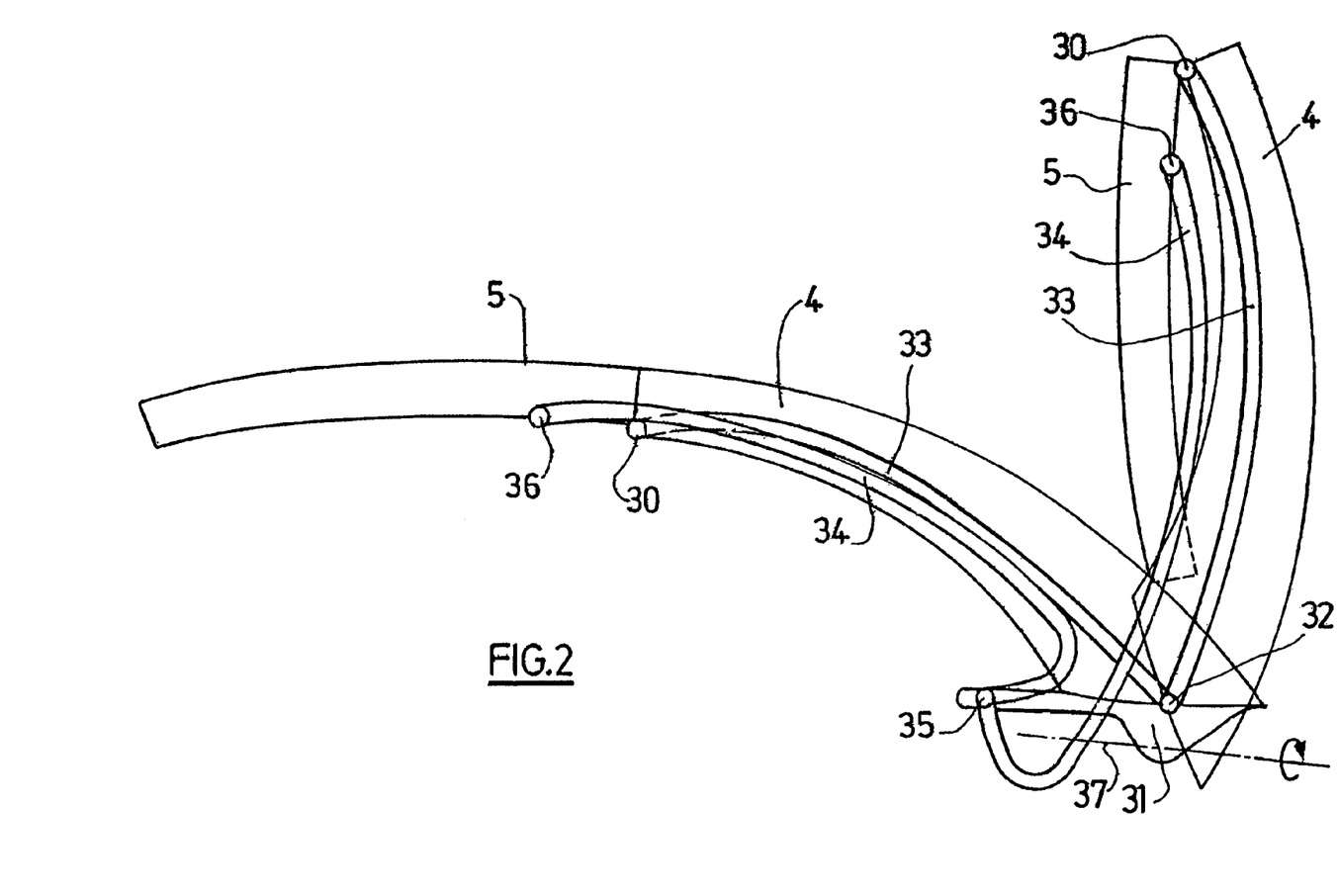
FIG. 2 is a side view of the means for folding the side roof elements in FIG. 1 in the closed position and in the intermediary folding position.

FIG. 2 demonstrates the left side roof elements 4 and 5 as well as their folding mechanism. The right side roof elements are similar.

The rear edge of the front side roof element 5 is articulated on the front edge of the rear side roof element 4 about a transversal axis 30. The rear edge of the rear side roof element 4 is articulated on a tipping-up device 31 about an axis 32. The axes 30 and 32 are transversal when the roof is, as shown in FIG. 2, either in the closed position or in the folded position, and are substantially vertical when the roof is in the stowed position as described below.

A reinforcement device 33 has one of its ends articulated on the axis 32 and its other end articulated on the axis 30. A lever 34 is articulated on the folding device 31 also on a transversal axis 35 but located at a given distance from the axis 32 and its other end articulated on the roof element 5 about a transversal axis 36 located at a given distance from the axis 30.

The folding device 31 is pivot mounted in relation to the chassis of the vehicle about a longitudinal axis 37.

Known driving means, and therefore not represented, are provided to actuate the elements described above.

The movement of the roof from its closed position to its stowed position is performed in the following manner. Its opposite movement from the stowed position to the closed position is performed in the opposite manner.

Firstly, the tailgate opens via rotation about the axis 10 using an actuator 11 and the roof element 1 is slid into the tailgate 9.

The element 3 is then tilted downwards about the axis 14 then slid under the element 2. The levers 25 and 26 are then tilted so as to bring the elements 2 and 3 into the position represented at the bottom of FIG. 3 where they are in the vertical position in front of the rear boot of the vehicle.

Figure 5:
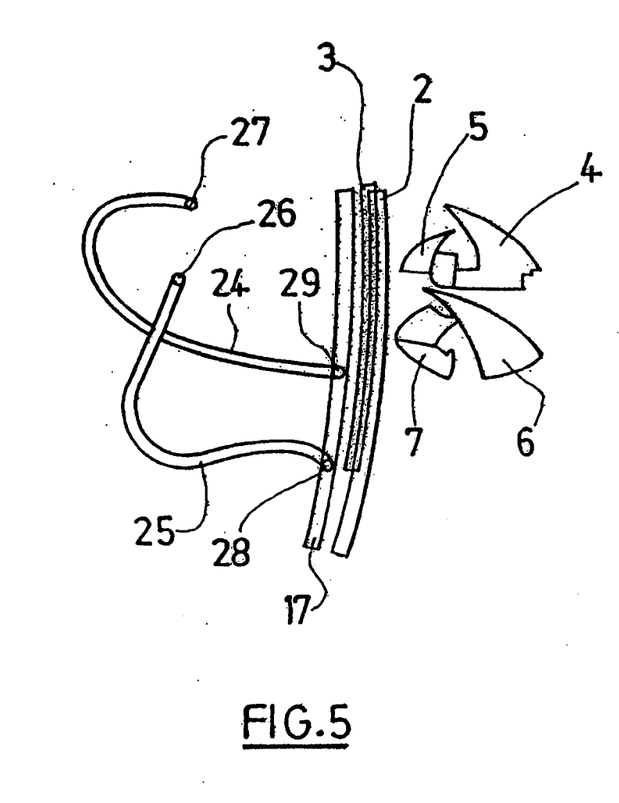
FIG. 5 is a side view of the roof elements in the stowed position.
Figure 6:
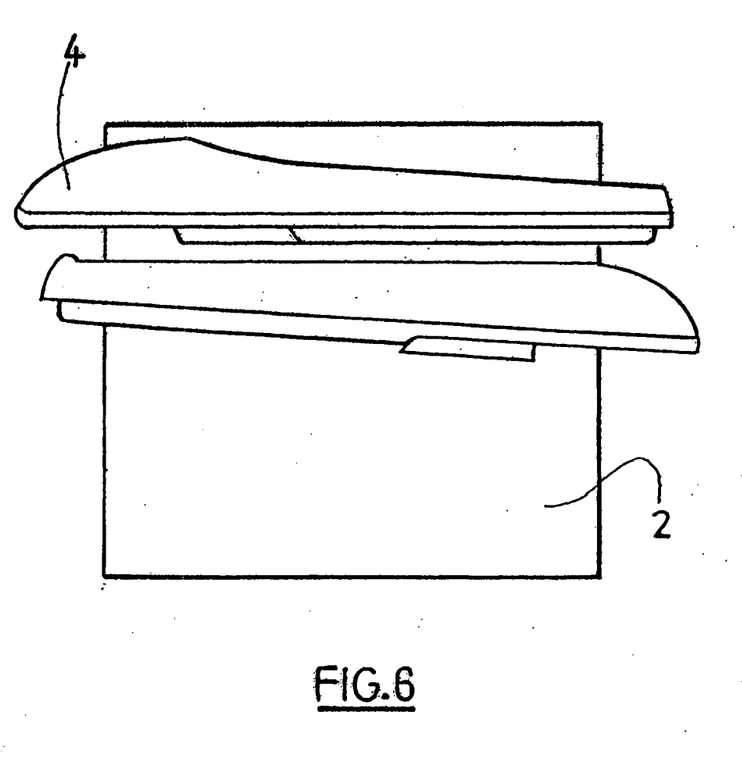
FIG. 6 is a rear view of these elements in the stowed position.

The levers 33 and 34 then provoke the lifting and the folding of the roof elements 4 and 5 into the position represented in FIG. 2, then a folding about the axis 37 brings the latter elements into the substantially horizontal position in FIG. 5 where they are at the rear of the elements 2 and 3, stacked in pairs.

Figures 7, 8:
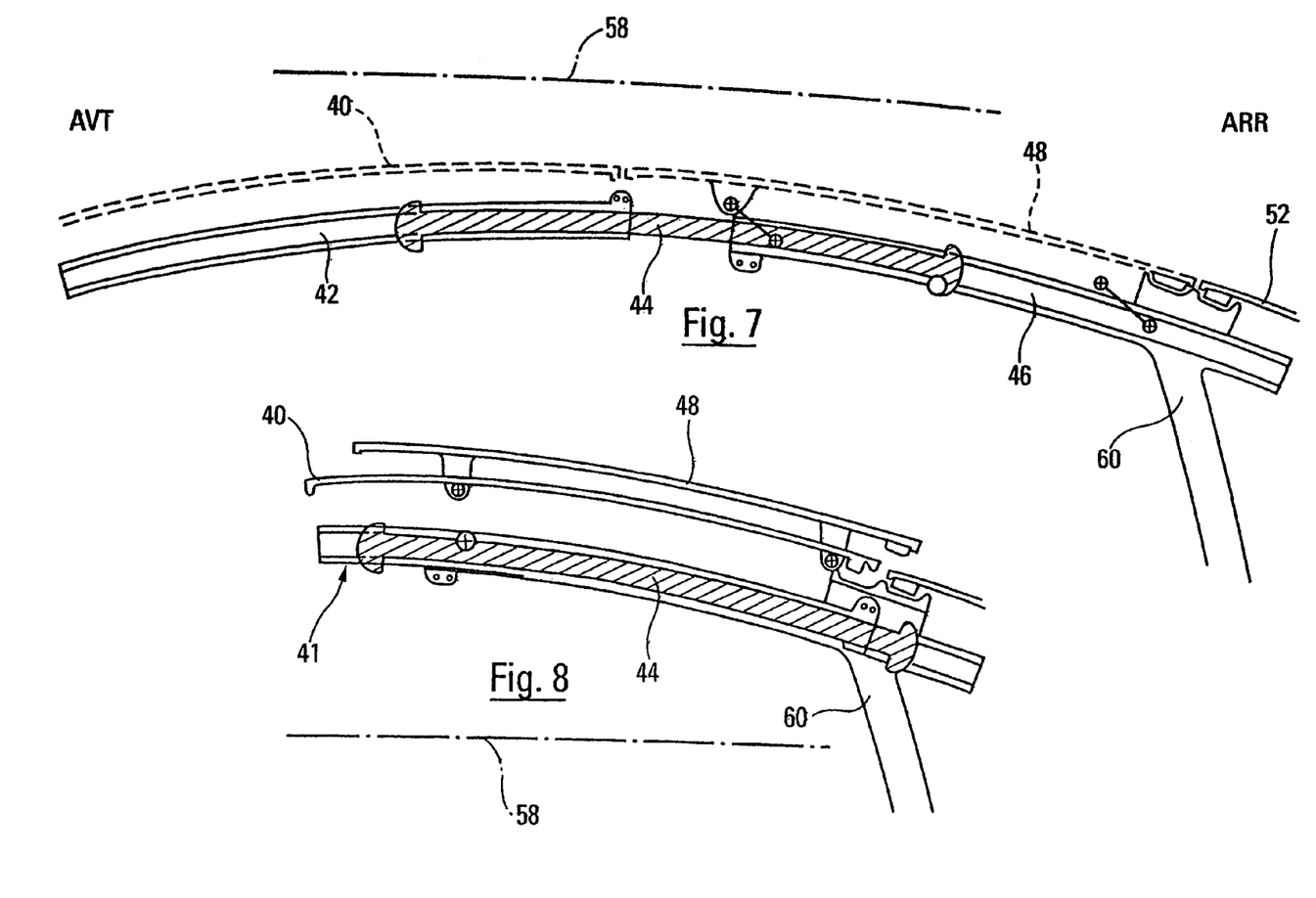

In the embodiment in drawings 7 to 12, the front roof element (panel) 40 is mounted on a first runner 42, which is engaged in a second runner 44, which in turn is engaged in a third runner 46 supported by the roof element 48 which, in the closed position of the roof above the passenger compartment as shown in FIG. 7, is located behind the panel 40, level with it, that being flush with the surrounding chassis of the vehicle (which can be constituted by the elements 4, 5, 6 and 7 as shown in FIG. 1 or by the body).

The roof panels 40 and 48 define two substantially plane panels located in front of a rear roof element 52, which normally incorporates the rear windscreen.

Possibly, the part 52 can all the same consist in a fixed part of the vehicle, that being defining a windscreen fixed to the body.

Being such, in this case, in drawing 7 we can assimilate the roof elements 40, 48 and 52 with the respective roof elements 3, 2 and 1 in FIG. 1, so that the front roof element 40 then comes, in its closed state as in drawing 7, into contact at the front of the transversal skirt 54 which limits the upper section of the windscreen 56 of the vehicle (see FIG. 1).

Also note that in order to ensure the relative displacement of the panels 40 and 48, the runner system 42, 44 and 46 principally extends substantially parallel to the longitudinal forward direction 58 of the vehicle.

If, once put in their stacked position as in drawing 8, the panels 40 and 48 should be stowed in the rear boot of the vehicle, then we advantageously provide that the third runner 46 is solidly linked to an arm 60, in the same manner as the rear roof element 52 (if it is movable) can itself be linked to another arm (not represented), these two articulation arms can correspond to the arms 24 and 25 in the embodiment represented in drawing 3, articulated about the transversal axes 26 and 27.

As can be seen in FIGS. 7 to 11, the embodiment presented here is such that, to open the front roof panel 40, it must be slid from the front (AVT) backwards (ARR), this sliding provokes the lifting of the rear panel 48 so as to free a space below it adapted for receiving the substantially axial sliding (practically no difference in height) of the front panel 40.

The panel 48 is linked to the runner 46 (also called the "first groove") via respectively front 53*a* and rear 53*b* arms extending under it and on each of which a lever articulates (such as 62 and 64, see below).

Thus, the roof part 48 will rise to allow the front roof part 40 to move under it. Once these front and rear roof parts are stacked on top of each other in a substantially horizontal position they can each pivot via the drive arm into the stowage space so as to be, for example, substantially vertical in position.

As already evoked, the front roof element 40 is mounted on the front runner 42, whereas the rear roof element is slide mounted on the rear runner 46, the intermediary runner 44 controlling the upward movements of the movable panel (in this case the rear panel 48).

During the stacking of the roof elements 40 and 48, the rear roof element 48 will be off-set upwardly along the third runner 46 to allow the front roof element 40 to move under it.

Figures 9, 10:
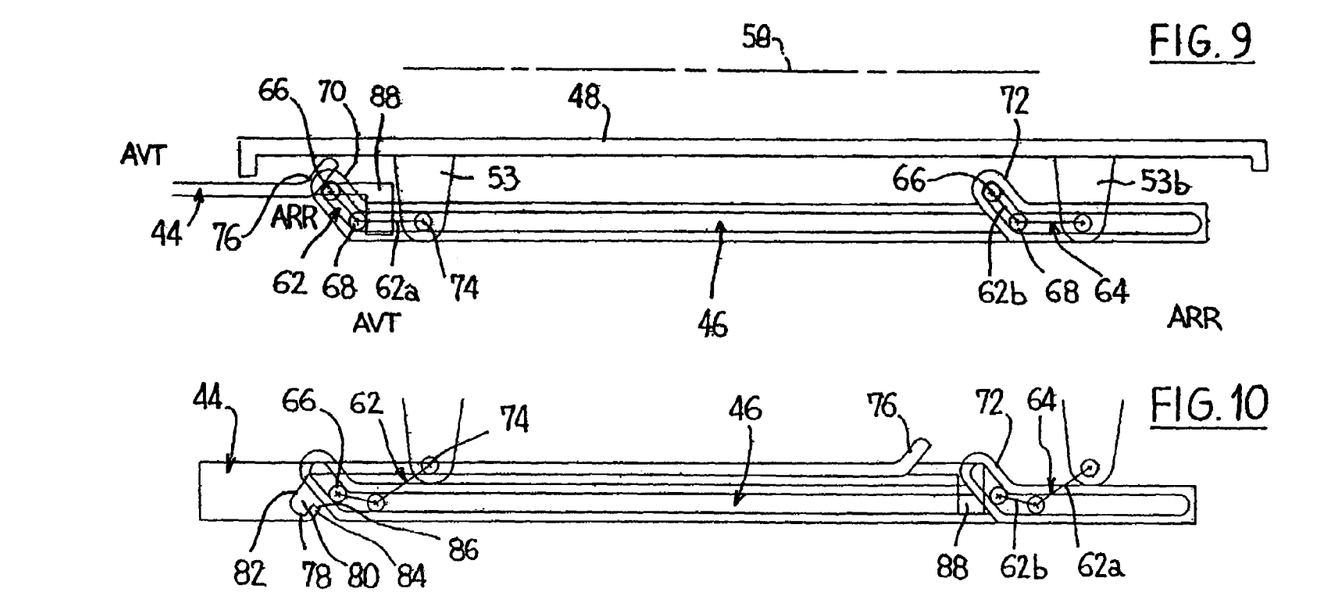
FIGS. 9, 10 and 11 demonstrate three different sliding possibilities and positions of the front and rear panels in question.
Figure 11:
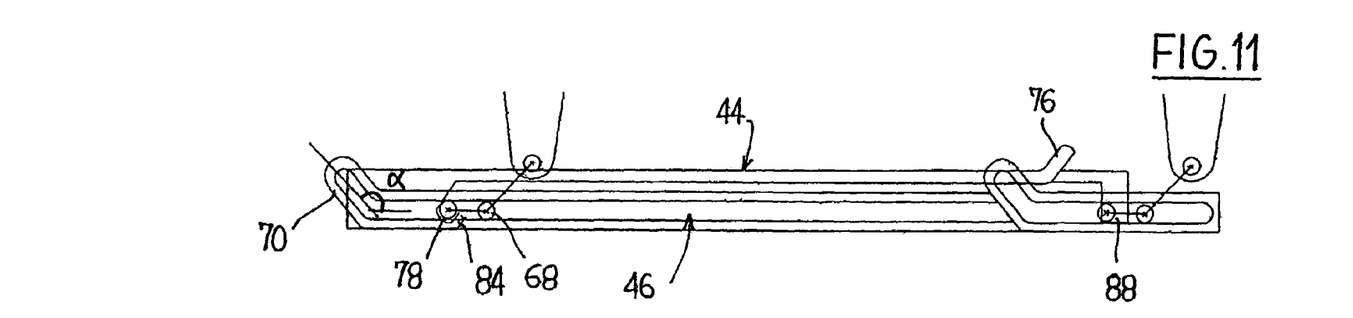

As shown in FIGS. 9 to 11, the rear roof element 48 is thus engaged in the third runner via the front 62 and rear 64 lever groups each being advantageous curved. Each elbow is articulated to the rear roof 48 via an axis of rotation perpendicular to the longitudinal direction 58. The end opposite the axis of rotation of the elbow in question is inserted into the third runner 46 via two sliders, such as 66 and 68.

When the roof elements 40 and 48 are in their closed position as in drawing 7, these elements are level with each other.

The third runner 46 comprises two deflected, or deflected, slips 70 and 72 oriented upwards and frontwards (in the direction of their free end) and respectively located at the front end and not far from the rear end of the runner. When the rear panel is "flush", at the bottom in drawings 7 and 9, the two sliders 66 and 68 of each elbow are fully inserted into these deflected slips, via the arm 62*b* of the lever in question which ends in articulating the roof (74), whereas the other part 62*a* of the elbow located between the sliders the furthest back and the point of articulation of the elbow in relation to the rear roof element is substantially horizontal along the third runner. This position of the elbow allows to have the rear roof in the low position and level with the front element of the rear roof 52.

During the backward sliding of the panel 40, the intermediary runner 44 will lean against a rear surface 76 on the sliders 66 then engaged as far forward and to the top of the front deflected slip 70, to allow the roof element 48 to tip upwards and to drive it backwards.

Thus, this second runner 44 can comprise at its rear end a contact surface (pusher 76) whose end is curved upwards and backwards. This curved surface will lean against the furthest forward and highest roller 66 and displace it along the deflected slip and downwards. The second slider 68 the furthest back will also move along this deflected slip in order to engage into the substantially horizontal part of the third runner. The curved part located between the second slider and the articulation 74 of the roof and of the curve will then will then be off-set upwards driving the rear roof upwards and backwards.

The runner 44 also comprises a zone creating a hook 78. This hook is located in retreat compared to said contact surface when said second runner moves backwards; it is therefore place to the front of the second runner 44 (see FIG. 10). This said hook zone will allow to continue the upward movement of the roof element 45, as well as driving it "horizontally" towards the rear, over a short distance, adapted for allowing the tipping-up of the front and rear levers 62 and 64. This hook 78 also allows to drive this same roof element 48 frontwards as far as the start of the deflected slip of the runner, when the front panel 40 is closed.

To aid this dual directional sliding, each drive hook 78 advantageously has a drive well 80 adapted for receiving the corresponding slider 66 and driving it along the guide 46 in question, the well which extends forward via a driving wall 82 adapted for driving the slider backwards, along the groove or runner 46, this well extending backwards via a short driving pin 84 making an access hole 86 for the slider, via the rear of the hook. Thus, the short driving pin will drive the slider 66 (and therefore the panel 48) frontwards as long as it engages into the groove 46 substantially along said longitudinal direction 58, but extricating from the slider when the latter engages in the deflected slip 70 when it meets it, of course this deflected slip thus being located in the extension of the groove and creating an obtuse angle α with it so that the slider can engage in the direction of its drive (FIG. 11).

Moreover, another contact surface 88 extending downwards and integral with the second runner 44 is located in front of said first contact zone 76. This second contact zone is on the rear part of the runner 46 (also called the first groove). In a backward displacement of the panel 40, when the furthest forward slider 66 of the lever 62 is engaged in the deflected slip 70 of the runner 46 and that this slider is moreover extricated from the hook 78, the second contact surface (or driving pin) 88 then leans against the furthest backward slider 68 so as to fully engage the two sliders into this deflected slip and thus position the rood panel 48 in its closed and low position, level with the front element 52 and the front panel 40.

For other details related to the relative disposition of the runners (or grooves) and their possible power-driven control, we refer to patent FR-A-2 797 226 (FIGS. 1, 2, 6 and 7 and their corresponding description).

Figure 12:
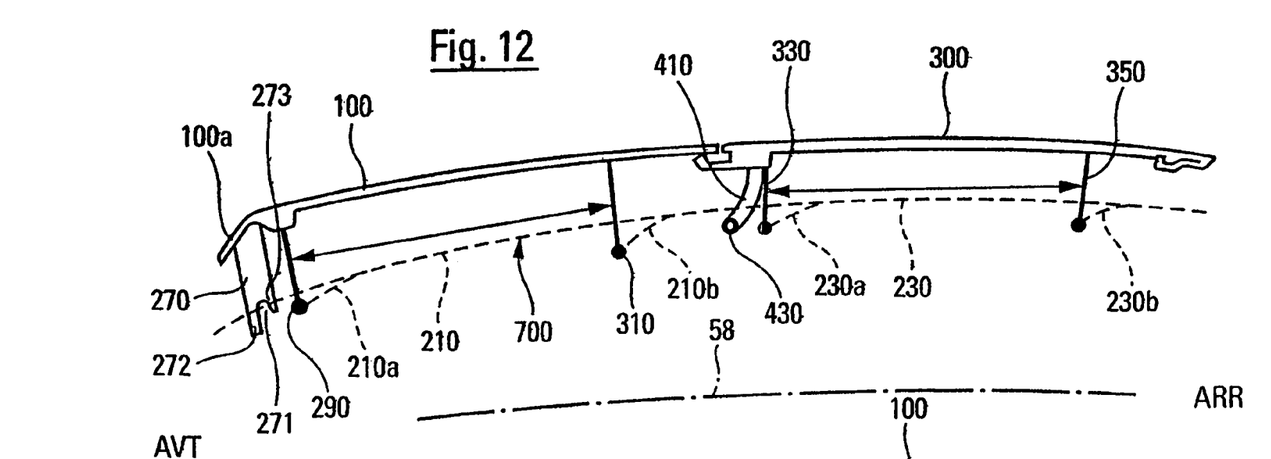
FIGS. 12 and 13 demonstrate an alternative embodiment in which the front roof panel moves over the rear panel when it moves backwards, thus freeing an opening above the passenger compartment, in the roof.
Figure 13:
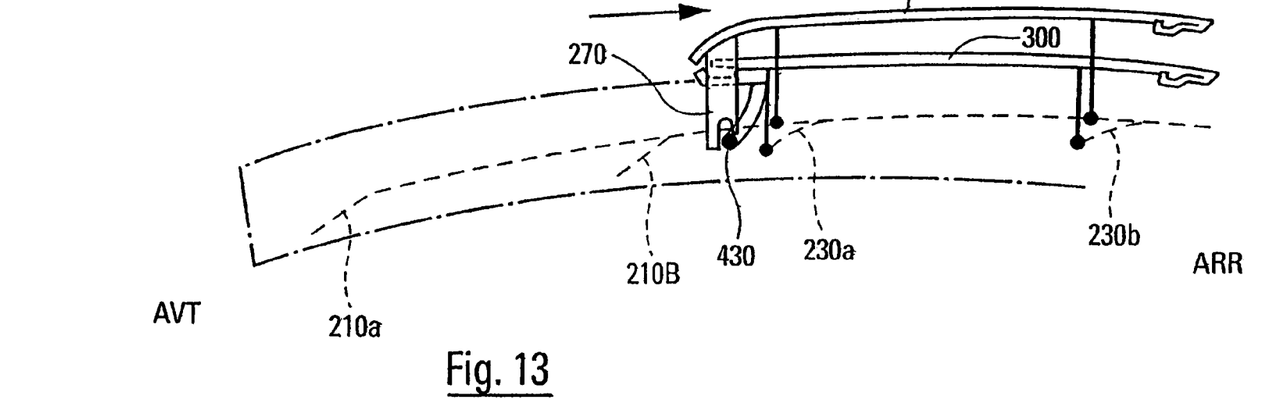

As illustrated in FIGS. 12 and 13, in an alternative embodiment, the front central roof element (or front panel) 100 can be slidingly mounted on a first groove 210 of a runner system 700 globally extending substantially parallel to the longitudinal direction 58. A second intermediary central roof element (or rear panel) 300 is in this case slide mounted on a second groove 230 of the runner 700.

In this case, the roof elements 100 and 300 stack one on top of the other so that the front roof element 100 moves above the roof element 300 (FIG. 13).

The runner 7 can be laterally fixed to the chassis 53 of the vehicle along bars fixed to the rood extending longitudinally at least along the side edges of the opening made in the roof of the vehicle to house the retractable roof.

An element creating a hook 270 is located on the front edge 100a of the roof element 100.

This roof element is driven backwards via known means that can consist in power-driven flexible cables. It is engaged in the first groove 210 via two sliders 290 and 310 with an axial distance L between them. The first slider 290 located the furthest forward from the front roof element is engaged in a deflected slip 210a (corresponding to an increase in the inclination of the groove 210) oriented towards the front of the vehicle and downwards. Said deflected slip is located at the front end of the groove 210. The second slider 310 located the furthest back from the roof element 100 is engaged in a second rear deflected slip 210b with the same orientation as the first and set apart from the latter by the same aforementioned length L. When the front roof 100 is driven backwards it is off-set in an upward direction thanks to the orientation of the first deflected slip 210a, as well as to the orientation of the second deflected slip 210b. The curve of the groove 210 thus allows the front roof element to move above the roof element 300.

When the roof element 100 slides backwards, the slider 290 displaces in the groove 210 and, in the vicinity of the deflected slip 210b, this slider moves along a rocking lever 690 then in the downward sloping position, until it makes this lever tilt upwards so that its rear part 690b blanks off the upper end of the deflected slip, once the slider 310 has been extracted. We understand that this selective guiding system with a lever tilts at the same location as the other rear deflected slip 230b in connection with the corresponding slider 350. Furthermore, when the roof panels are being deployed into their closed position above the passenger compartment, the opposite travel of the front sliders of each panel actuates the return rocking of the levers in question, prior to the associated rear sliders engaging into the corresponding deflected slips.

The roof element 300 is mounted on the second groove 230 via two sliders 330 and 350 also separated by a length L. The first slider 330 the furthest forward from this roof element is engaged in the deflected slip 230a oriented towards the front of the vehicle and downwards. This deflected slip is located at the front end of the second groove 230 of the runner. The second slider 350 located the furthest back from the roof element 300 is engaged in the second deflected slip 230b with the same orientation as the first and set apart from the latter by the same length L. When the roof element 300 is driven backwards by the front roof element it is off-set in an upward direction thanks to the orientation of the deflected slips 230a and 230b.

The front edge of the roof element 300 comprises an arm 410 extending downwards and comprising, at its lower end, a pin or a roller 430. When the front roof element reaches a horizontal position above the roof element 300 (FIG. 13), the hook 270 located on the front edge of the front central roof element leans against said pin. The hook will then drive the roof element 300 backwards and off-set it in an upward direction along said two deflected slips 230a and 230b, to allow the intermediary central roof element to move above another roof element further back (not represented), the curve of the runner which extends upwards, moreover, ensures that the front roof element 100 moves above this roof element that is further back.

In FIGS. 12 and 13 we also note the shape of the hook 270 which is highly compatible with the hook 78 in drawing 10, with its well 271 adapted for receiving the slider 430 and driving it along the corresponding guide. The well extending forward via the wall 272 adapted for driving the slider backwards (ARR), along the groove 230a and then 230, this well extending backwards via the short pin 273 making an inlet for the slider, behind the hook, so that this pin drives the slider forward as long as it is engaged in the groove substantially along said longitudinal direction 58, but extricating from the slider when the latter engages in the deflected slip 230a when it meets in the continuation of its forward movement.

The invention claimed is:

1. A retractable roof system for a motor vehicle including a vehicle structure and having a front end and a rear end, the retractable roof system comprising at least a front roof panel and a rear roof panel which are movable in relation to each other along a longitudinal direction of the vehicle between:
   a flush position in which the roof panels are placed substantially at the same level as each other, the front roof panel thus being located in front of the rear roof panel, along said longitudinal direction; and,
   an off-set position in an upward direction in which the roof panels are placed at least partially one above the other;
one of the front and rear roof panels bearing a group of front levers and a group of articulated rear levers, so as to tip over between:
   a low position in which said one of the front and rear panels is substantially flush with a surround part of the vehicle structure,
   and a high position in which said one of the front and rear panels is off-set in an upward direction in relation to the level of its flush position;
wherein:
   said front and rear group of levers are pivotally mounted in relation to said roof panel which bears them;
   at least one of said front and rear roof panels comprises driving means for driving the lever groups and one of said roof panels, together:
      either from the front towards the rear, along a distance ensuring said roof panel to move from said flush position to said off-set position in an upward direction,
      or from the rear towards the front, along said distance, but in the opposite direction, to ensure said roof panel to move from said off-set position to said flush position; and
   the lever groups engage, under the control of the driving means, guides extending essentially substantially parallel to said longitudinal direction, said guides being adapted for:
      during the controlled displacement of the lever groups from the front towards the rear, guiding the tipping over movement from the flush position of the corresponding roof panel to the off-set position; and
      during the controlled displacement of said lever groups from the rear towards the front, guiding the tipping over movement from the off-set position of the corresponding panel towards the flush position,
   the guides comprise runners provided with first grooves in which the lever groups slide, the runners locally having deflected slips extending obliquely in relation to the horizontal and in relation to said longitudinal direction, along a length adapted to receive, individually, a part of said lever groups, so that once engaged in the deflected slips, said lever groups move, by pivoting, from one of the high and low positions towards the other position,
   along the longitudinal direction of the vehicle, said runners comprise second grooves,
   one of the roof panels is slidingly mounted in relation to the other roof panel along said second grooves, at least some of the levers fitted to the corresponding panel comprise a slider slidingly mounted in the first corresponding groove; and the driving means comprise a driving hook having a driving recess adapted for receiving and driving said slider along the corresponding guide, the recess extending frontwards via a driving wall adapted for driving the corresponding slider rearward, along said first groove, said recess extending rearward via a driving pin defining an inlet for the slider, via the rear of said driving hook, so that the driving pin drives the slider forward as long as it engages the first groove substantially along said longitudinal direction, but extricating from the slider when said slider engages in the deflected slip of said first groove that it encounters, said deflected slip thus being located in the extension of the groove and making an obtuse angle therewith, so that the slider can engage therein in the direction of its drive.

2. The retractable roof system of claim 1, wherein the lever groups individually comprise a curved lever comprising a first arm rotatingly articulated on the corresponding roof panel and fixedly attached via an elbow to a second arm which engages one of said guides, in order to guidingly drive it.

3. The retractable roof system of claim 1, wherein:
the sliders are disposed on the second arm of at least some of the levers,
the driving means extend along said longitudinal direction,
the front panel is slidingly mounted in relation to the rear panel in order to move under said rear panel, and,
therefore, the deflected slips of each first groove are oriented upwards and the lever groups are linked to the rear panel under which the first groove extends.

4. The retractable roof system of claim 1, wherein the driving means comprise, towards a rear end, a contact surface adapted for engaging at least one lever from the lever groups, when the latter is in the low position, and drives it rearward along with itself.

5. The retractable roof system of claim 1, wherein:
the front roof panel is slidingly mounted in relation to the rear panel in order to move under it, and,
the driving means of the front roof panel comprise, towards a rear end, a second driving pin adapted for fully engaging, in the corresponding deflected slips, the front lever group fitted to the rear roof panel, once said levers are free from the corresponding driving pin, further to a forward sliding of the front roof panel, so that the rear roof panel then moves into its flush position.

6. The retractable roof system of claim 1, wherein:
the front roof panel is slidingly mounted in relation to the rear panel in order to move under said rear panel, and,
the driving means of the front roof panel comprise, towards a rear end, a second driving pin adapted for fully engaging, in the corresponding deflected slips, the front lever group fitted to the rear roof panel, further to a forward sliding of the front roof panel, so that the rear roof panel then moves into said flush position.

7. A motor convertible vehicle having a front end and a rear end, and comprising:
a vehicle structure including a rear boot, and,
a retractable movable roof including at least a front roof panel and a rear roof panel which are movable in relation to the vehicle structure, to be stowed in the rear boot, and to each other along a longitudinal direction of the vehicle between:
a flush position in which the roof panels are placed substantially at the same level as each other, the front roof panel thus being located in front of the rear roof panel, along said longitudinal direction; and,
an off-set position in an upward direction in which the roof panels are placed at least partially one above the other;
one of the front and rear roof panels bearing a group of front levers and a group of articulated rear levers, so as to tip over between:
a low position in which said one of the front and rear panels is substantially flush with a surround part of the vehicle structure,
and a high position in which said one of the front and rear panels is offset in an upward direction in relation to the level of said flush position;
wherein:
said front and rear group of levers are pivotally mounted in relation to said roof panel which bears them;
at least one of said front and rear roof panels comprises driving means for driving both the lever groups and one of said roof panels:
either from the front towards the rear, along a distance ensuring said roof panel to move from said flush position to said off-set position in an upward direction,
or from the rear towards the front, along said distance, but in the opposite direction, to ensure said roof panel to move from said off-set position to said flush position;
the lever groups engage, under the control of the driving means, guides extending essentially substantially parallel to said longitudinal direction, said guides being adapted for:
during the controlled displacement of the lever groups from the front towards the rear, guiding said tipping over movement from the flush position of the corresponding roof panel to the off-set position; and
during the controlled displacement of said lever groups from the rear towards the front, guiding said tipping over movement from the offset position of the corresponding panel towards the flush position; and
the driving means comprise, towards a rear end, a contact surface adapted for engaging at least one lever from the lever groups, when the latter is in the low position, and drives said at least one lever rearward alone with itself.

8. The vehicle of claim 7, wherein the lever groups individually comprise a curved lever comprising a first arm rotatingly articulated on the corresponding roof panel and fixedly attached via an elbow to a second arm which engages one of said guides, in order to guidingly drive said one of the guides.

9. The vehicle of claim 7, wherein the guides comprise runners provided with first grooves in which the lever groups slide, the runners locally having deflected slips extending obliquely in relation to the horizontal and in relation to said longitudinal direction, along a length adapted to receive, individually, a part of said lever groups, so that once engaged in the deflected slips, said lever groups move, by pivoting, from one of the high and low positions towards the other position.

10. The vehicle of claim 9, wherein:
along the longitudinal direction of the vehicle, said runners comprise second grooves, one of the roof panels is slidingly mounted in relation to the other roof panel along said second grooves, at least some of the levers fitted to the corresponding panel comprise a slider slidingly mounted in the first corresponding groove; and the driving means comprise a driving hook having a driving recess adapted for receiving and driving said slider along the corresponding guide, the recess extending frontwards via a driving wall adapted for driving the corresponding slider rearward, along said first groove, said recess extending rearward via a driving pin defining an inlet for the slider, via the rear of said driving hook, so that the driving pin drives the slider forward as long as it engages the first groove substantially along said longitudinal direction, but extricating from the slider when said slider engages in the deflected slip of said first groove that it encounters, said deflected slip thus being located in the extension of the groove and making an obtuse angle therewith, so that the slider can engage therein in the direction of its drive.

11. The vehicle of claim 7, wherein the rear boot is closed by a tailgate under which the retractable roof is adapted to be stowed.

* * * * *